United States Patent
Mehra et al.

(10) Patent No.: US 11,043,040 B2
(45) Date of Patent: Jun. 22, 2021

(54) EXTENDED REALITY BASED POSITIVE AFFECT IMPLEMENTATION FOR PRODUCT DEVELOPMENT

(71) Applicant: ACCENTURE GLOBAL SOLUTIONS LIMITED, Dublin (IE)

(72) Inventors: Rohit Mehra, Delhi (IN); Vibhu Saujanya Sharma, Bangalore (IN); Vikrant Kaulgud, Pune (IN); Sanjay Podder, Thane (IN); Adam Patten Burden, Tampa, FL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/878,386

(22) Filed: May 19, 2020

(65) Prior Publication Data
US 2020/0372717 A1    Nov. 26, 2020

(30) Foreign Application Priority Data

May 21, 2019 (IN) .............................. 201911020057

(51) Int. Cl.
*G06F 17/00* (2019.01)
*G06T 19/00* (2011.01)
(Continued)

(52) U.S. Cl.
CPC ............ *G06T 19/006* (2013.01); *G06F 3/011* (2013.01); *G06F 3/017* (2013.01); *G06F 40/20* (2020.01);
(Continued)

(58) Field of Classification Search
None
See application file for complete search history.

(56) References Cited

U.S. PATENT DOCUMENTS

| 8,494,215 B2 * | 7/2013 | Kimchi | G06T 19/006 |
| | | | 382/103 |
| 2005/0212758 A1 * | 9/2005 | Marvit | G06F 1/1686 |
| | | | 345/156 |

(Continued)

OTHER PUBLICATIONS

S. Datta, V. Kaulgud, V. S. Sharma, and N. Kumar, "A social network based study of software team dynamics," in Proceedings of the 3rd India Software Engineering Conference, ser. ISEC '10. New York, NY, USA: ACM, 2010, pp. 33-42. [Online]. Available: http://doi.acm.org/10.1145/1730874.1730883.

(Continued)

*Primary Examiner* — Martin Mushambo
(74) *Attorney, Agent, or Firm* — Mannava & Kang, P.C.

(57) ABSTRACT

In some examples, extended reality based positive affect implementation for product development may include determining, for a user wearing or utilizing a device, characteristics and an environment of the user. Based on the characteristics and the environment of the user, a plurality of augmentation elements may be determined. A recommendation of a plurality of augmentation elements from the determined plurality of augmentation elements may be generated. Based on selection of an augmentation element from the recommended plurality of augmentation elements, the augmentation element may be rendered in an extended environment and/or an immediate environment of the user. Interaction of the user may be controlled with the rendered augmentation element. Feedback of the user may be analyzed with respect to the rendered augmentation element.

20 Claims, 11 Drawing Sheets

(51) Int. Cl.
  *G06F 40/20* (2020.01)
  *G06F 3/01* (2006.01)
  *G06T 19/20* (2011.01)
  *G06Q 50/00* (2012.01)
(52) U.S. Cl.
  CPC ............ *G06T 19/20* (2013.01); *G06Q 50/01* (2013.01); *G06T 2219/2012* (2013.01); *G06T 2219/2016* (2013.01)

(56) References Cited

U.S. PATENT DOCUMENTS

| | | | | |
|---|---|---|---|---|
| 2014/0098134 | A1* | 4/2014 | Fein | G06F 3/013 345/633 |
| 2015/0269525 | A1* | 9/2015 | Hazy | G06Q 10/0637 434/237 |
| 2015/0281252 | A1* | 10/2015 | Melcher | H04L 67/1042 726/4 |
| 2017/0243400 | A1* | 8/2017 | Skidmore | G06F 3/04842 |
| 2018/0047196 | A1* | 2/2018 | Du | G06F 21/6209 |
| 2018/0150550 | A1* | 5/2018 | Sharma | G06F 9/451 |

OTHER PUBLICATIONS

V. S. Sharma, R. Mehra, and V. Kaulgud, "What do developers want?: an advisor approach for developer priorities," in Proceedings of the 10th International Workshop on Cooperative and Human Aspects of Software Engineering. IEEE Press, 2017, pp. 78-81.

T. Shaw, "The emotions of systems developers: An empirical study of affective events theory," in Proceedings of the 2004 SIGMIS Conference on Computer Personnel Research: Careers, Culture, and Ethics in a Networked Environment, ser. SIGMIS CPR '04. New York, NY, USA: ACM, 2004, pp. 124-126. [Online]. Available: http://doi.acm.org/10.1145/982372.982403.

D. Graziotin, X. Wang, and P. Abrahamsson, "Software developers, moods, emotions, and performance," IEEE Software, vol. 31, No. 4, pp. 24-27, Jul. 2014.

"Are happy developers more productive?" in Product-Focused Software Process Improvement, J. Heidrich, M. Oivo, A. Jedlitschka, and M. T. Baldassarre, Eds. Berlin, Heidelberg: Springer Berlin Heidelberg, 2014, pp. 50-64.

I. A. Khan, W.-P. Brinkman, and R. M. Hierons, "Do moods affect programmers’ debug performance?" Cogn. Technol. Work, vol. 13, No. 4, pp. 245-258, Nov. 2011. [Online]. Available: http://dx.doi.org/10.1007/s10111-010-0164-1.

R. Colomo-Palacios, A. Herna'ndez-Lo'pez, A'. Garc'ia-Crespo, and P. Soto-Acosta, "A study of emotions in requirements engineering," in Organizational, Business, and Technological Aspects of the Knowledge Society, M. D. Lytras, P. Ordonez de Pablos, A. Ziderman, A. Roulstone, H. Maurer, and J. B. Imber, Eds. Berlin, Heidelberg: Springer Berlin Heidelberg, 2010, pp. 1-7.

D. Graziotin, F. Fagerholm, X. Wang, and P. Abrahamsson, "Consequences of unhappiness while developing software," in 2017 IEEE/ACM 2nd International Workshop on Emotion Awareness in Software Engineering (SEmotion), May 2017, pp. 42-47.

S. C. Muller and T. Fritz, "Stuck and frustrated or in flow and happy: Sensing developers' emotions and progress," in 2015 IEEE/ACM 37th IEEE International Conference on Software Engineering, vol. 1, May 2015, pp. 688-699.

D. Girardi, F. Lanubile, N. Novielli, and D. Fucci, "Sensing developers' emotions: The design of a replicated experiment," in Proceedings of the 3rd International Workshop on Emotion Awareness in Software Engineering, ser. SEmotion '18. New York, NY, USA: ACM, 2018, pp. 51-54. [Online]. Available: http://doi.acm.org/10.1145/3194932.3194940.

V. Sinha, A. Lazar, and B. Sharif, "Analyzing developer sentiment in commit logs," in 2016 IEEE/ACM 13th Working Conference on Mining Software Repositories (MSR), May 2016, pp. 520-523.

T. DeMarco and T. Lister, "Programmer performance and the effects of the workplace," in Proceedings of the 8th International Conference on Software Engineering, ser. ICSE '85. Los Alamitos, CA, USA: IEEE Computer Society Press, 1985, pp. 268-272. [Online]. Available: http://dl.acm.org/citation.cfm?id=319568.319651.

P. Roelofsen, "The impact of office environments on employee performance: The design of the workplace as a strategy for productivity enhancement," Journal of Facilities Management, vol. 1, No. 3, pp. 247-264, 2002. [Online]. Available: https://doi.org/10.1108/14725960310807944.

N. Kwallek, C. M. Lewis, and A. S. Robbins, "Effects of office interior color on workers' mood and productivity," Perceptual and Motor Skills, vol. 66, No. 1, pp. 123-128, 1988. [Online]. Available: https://doi.org/10.2466/pms.1988.66.1.123.

G. Riva, F. Mantovani, C. S. Capideville, A. Preziosa, F. Morganti, D. Villani, A. Gaggioli, C. Botella, and M. Alcaniz, "Affective interactions using virtual reality: The link between presence and emotions," CyberPsychology & Behavior, vol. 10, No. 1, pp. 45-56, Feb. 2007. [Online]. Available: https://doi.org/10.1089/cpb.2006.9993.

O. Baus and S. Bouchard, "Moving from virtual reality exposurebased therapy to augmented reality exposure-based therapy: A review," Frontiers in Human Neuroscience, vol. 8, p. 112, 2014. [Online]. Available: ttps://www.frontiersin.org/article/10.3389/fnhum.2014.00112.

C. Botella, J. Breton-Lopez, S. Quero, R. Banos, and A. Garcia-Palacios, "Treating cockroach phobia with augmented reality," BehavTher, vol. 41, No. 3, pp. 401-413, Sep. 2010.

R. M. Banos, V. Liano, C. Botella, M. Alcaniz, B. Guerrero, and B. Rey, "Changing induced moods via virtual reality," in Persuasive Technology, W. A. IJsselsteijn, Y. A. W. de Kort, C. Midden, B. Eggen, and E. van den Hoven, Eds. Berlin, Heidelberg: Springer Berlin Heidelberg, 2006, pp. 7-15.

A. Elliott, B. Peiris, and C. Parnin, "Virtual reality in software engineering: Affordances, applications, and challenges," in 2015 IEEE/ACM37th IEEE International Conference on Software Engineering, vol. 2, May 2015, pp. 547-550.

V. S. Sharma, R. Mehra, V. Kaulgud, and S. Podder, "An immersive future for software engineering: Avenues and approaches," in Proceedings of the 40th International Conference on Software Engineering: New Ideas and Emerging Results, ser. ICSE-NIER '18. New York, NY, USA: ACM, 2018, pp. 105-108. [Online]. Available: http://doi.acm.org/10.1145/3183399.3183414.

M. Oppezzo and D. L. Schwartz, "Give your ideas some legs: The positive effect of walking on creative thinking." Journal of experimental psychology: learning, memory, and cognition, vol. 40, No. 4, p. 1142, 2014.

M. C. Juan, R. Banos, C. Botella, D. P'erez, M. Alcan'iiz, and C. Monserrat, "An augmented reality system for the treatment of acrophobia: The sense of presence using immersive photography," Presence, vol. 15, No. 4, pp. 393-402, Aug. 2006.

M. Wells and R. Perrine, "Critters in the cube farm: perceived psychological and organizational effects of pets in the workplace," J Occup Health Psychol, vol. 6, No. 1, pp. 81-87, Jan. 2001, https://www.ncbi.nlm.nih.gov/pubmed/11199259.

E. Largo-Wight, W. W. Chen, V. Dodd, and R. Weiler, "Healthy workplaces: the effects of nature contact at work on employee stress and health," Public Health Rep, vol. 126 Suppl 1, No. Suppl 1, pp. 124-130, 2011, 21563720[pmid]. [Online]. Available: https://www.ncbi.nlm.nih.gov/pubmed/21563720.

U. A. Stigsdotter and P. Grahn, "A garden at your workplace may reduce stress," Design & Health, pp. 147-157, 2004.

T. Kim, S. Hwang, S. Kim, H. Ahn, and D. Chung, "Smart contact lenses for augmented reality and methods of manufacturing and operating the same," Mar. 31, 2016, U.S. Appl. No. 14/644,488.

* cited by examiner

US 11,043,040 B2

EXTENDED REALITY BASED POSITIVE AFFECT IMPLEMENTATION FOR PRODUCT DEVELOPMENT

PRIORITY

The present application claims priority under 35 U.S.C. 119(a)-(d) to Indian Provisional Patent Application number 201911020057, having a filing date of May 21, 2019, the disclosure of which is hereby incorporated by reference in its entirety.

BACKGROUND

A product development environment may include various features such as desks, chairs, etc. The product development environment may include various technological features such as computers, lights, displays, etc. Such environments may be designed to house product developers of various backgrounds, age, and gender.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
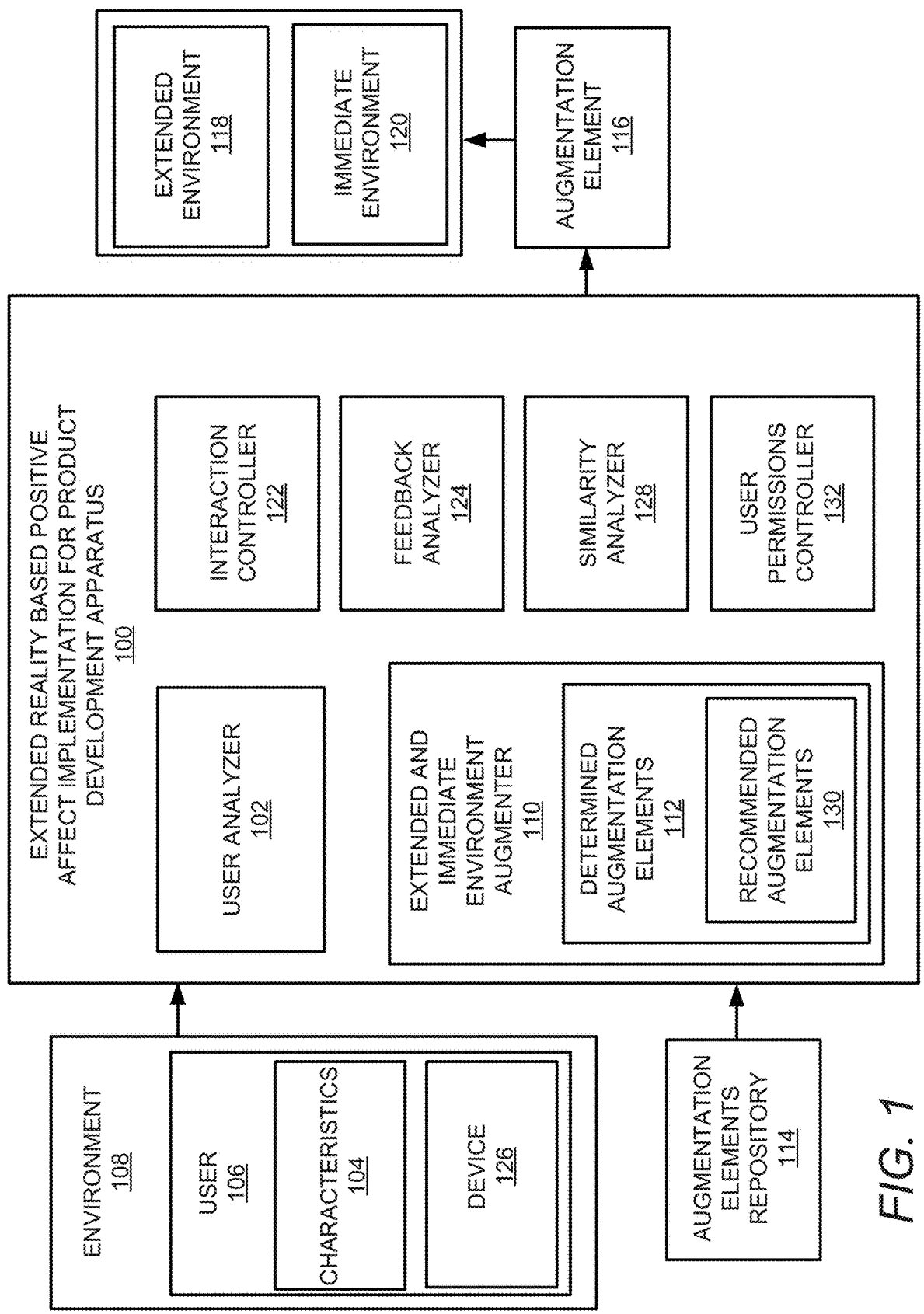
FIG. 1 illustrates a layout of an extended reality based positive affect implementation for product development apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Extended reality based positive affect implementation for product development apparatuses, methods for extended reality based positive affect implementation for product development, and non-transitory computer readable media having stored thereon machine readable instructions to provide extended reality based positive affect implementation for product development are disclosed herein. The apparatuses, methods, and non-transitory computer readable media disclosed herein provide for extended reality based positive affect implementation for product development by utilizing extended reality to virtually transform, for example, a product developer's, such as a software product developer's, extended and immediate environment, in a way that induces positive effects. For an example of a software development environment as disclosed herein, this transformation of the extended and immediate environment may improve the developer's performance during development related activities such as programming and debugging. In this regard, the apparatuses, methods, and non-transitory computer readable media disclosed herein may utilize sense of presence, uniqueness, and customization.

With respect to product development, a product developer, such as a software developer, may spend a relatively large amount of time writing or debugging code at their desk. In some cases, this desk may be situated in an open floor plan, shared with other team members. In this regard, the uniqueness of a developer may not be taken into consideration, leading to generalized workspace setups, which may be relatively mundane. Moreover, the scope for personalization may be limited as any personalization may affect everyone.

The characteristics of a workplace and developer's ambient environment may have a significant influence on their productivity. In this regard, it is technically challenging to transform a developer's ambient environment in a way that fosters positive effects during ongoing development related activities.

The efficacy of immersive technologies such as extended reality (XR) may be implemented as an affective medium. For example, augmented reality (AR) may be capable of inducing negative effects such as fear and disgust for the treatment, for example, of insect phobia. Virtual reality (VR) maximum intensity projection (MIP) may represent a VR based adaptable virtual environment (e.g., a park) which modifies itself in accordance with the mood to be induced to the wearer. In this regard, the apparatuses, methods, and non-transitory computer readable media disclosed herein address the aforementioned technical challenges by implementing extended reality for product development, such as software development, to impact the emotions and moods of the relevant users, such as the product developers.

In some areas, extended reality may be utilized across multiple software engineering phases, roles and activities such as code review by developers and insights visualization by project managers. In this regard, extended reality, due to its immersive, effective and readily modifiable nature, may be implemented to assist with how developers visualize and feel about their development environments. The immersive experiences may leverage affordances of natural human perception, such as spatial memory, motion, manipulation and feed-back for increased comprehension of three-dimensional visualizations and enhanced creativity.

For the apparatuses, methods, and non-transitory computer readable media disclosed herein, devices such as the Microsoft Hololens™ head-mounted display (HMD) for example may allow spatial mapping and hologram placement, three-dimensional audio, and multiple types of gestures which may make an experience more immersive and real.

The apparatuses, methods, and non-transitory computer readable media disclosed herein may implement a framework for transforming a developer's immediate and extended environment by using extended reality such that the environment may help to induce positive effects. The apparatuses, methods, and non-transitory computer readable media disclosed herein may implement a categorization based on where the augmentation takes place, and who decides the augmentation. The focus of these implementations may include creation of a positive ambience, which may help a product developer during their engineering activities.

According to examples disclosed herein, the apparatuses, methods, and non-transitory computer readable media disclosed herein may implement augmented reality and mixed reality. In this regard, the augmented reality, which may encompass mixed reality, may refer to the use of devices that may understand and map a user's surroundings, and may overlay virtual three-dimensional models in the user's field of view, thereby augmenting the user's real environment. As opposed to augmented reality, in virtual reality, a user may be blocked-out from the real-world and may be completely immersed in the virtual world.

The apparatuses, methods, and non-transitory computer readable media disclosed herein may implement extended reality to enrich existing activities in engineering environments, such as software engineering, and may also enable new experiences, such as workspace augmentation.

According to examples disclosed herein, the apparatuses, methods, and non-transitory computer readable media disclosed herein may provide technical benefits such as visual realism and sense of presence. For example, extended reality may allow individuals to be immersed in a computer-generated virtual environment which looks and feels real (depending upon the quality of three-dimensional content used). The extended reality may also be capable of inducing a sense of "being there".

According to examples disclosed herein, the apparatuses, methods, and non-transitory computer readable media disclosed herein may provide technical benefits such as interactivity. In this regard, extended reality may leverage affordances of natural human perception such as navigation, manipulation, feedback, etc., to interact with virtual content. These aspects may provide for increased comprehension and recall.

According to examples disclosed herein, the apparatuses, methods, and non-transitory computer readable media disclosed herein may provide technical benefits such as customization and safety. For example, extended reality may facilitate transformation of the virtual environment, as opposed to transformations in the real world. For example, a brick wall may be replaced with a glass wall for a better looking ambience, saving time, effort and cost consumption in the real-world, as opposed to implementation in the virtual environment. Moreover, activities in the virtual environment may be completely safe as the content itself is not tangible (e.g., only appears tangible).

According to examples disclosed herein, the apparatuses, methods, and non-transitory computer readable media disclosed herein may provide technical benefits such as uniqueness. In this regard, experiences in the immersive virtual environment may be customized towards the needs of a particular individual, and may be visible to the concerned individual who is wearing the immersive device (unless the experience is deliberately shared).

According to examples disclosed herein, the apparatuses, methods, and non-transitory computer readable media disclosed herein may provide technical benefits such as an effective medium. For example, as disclosed herein, extended reality may be known to be an effective medium, capable of inducing both positive and negative effects in the wearer.

While there may be multiple ways to categorize how extended reality may be leveraged for augmenting workspaces, for the apparatuses, methods, and non-transitory computer readable media disclosed herein, the categorization may be based on parameters that include where the augmentation takes place (e.g., extended environment versus immediate), and who decides that augmentation (e.g., team versus personal).

According to examples disclosed herein, the apparatuses, methods, and non-transitory computer readable media disclosed herein may provide technical benefits such as extended environment augmentation. In this regard, with respect to augmentation of the workplace, depending upon the workplace environment, the extended environment augmentation may result in augmentation of floors, ceilings, walls, etc. This may be initiated by a team by an agreement, for example, by creating a virtual waterfall, or wall-garden in the extended work area, or even individually by different team members, for example creating virtual overlays to all the walls based upon a favorite leisure destination. In the team-decided case, everyone may see the same augmentation at the same extended space, while in the personal case, each team member may see the augmentation that they decided to be placed, hence making the augmentation unique to a team member.

According to examples disclosed herein, the apparatuses, methods, and non-transitory computer readable media disclosed herein may provide technical benefits such as immediate augmentation. In this regard, with respect to augmentation of a developer's immediate surroundings (e.g., the work desk and area around it), this area may represent the personal space of each team member and may include a potential for the individual to place many different extended reality augmentations that have a specific meaning and importance to the individual (e.g., a pet). However, this augmentation may also include a team-oriented augmentation which may be decided by a consensus around a certain event, or a context important to the entire team. An example of this augmentation may include overlaying the desk partitions with the colors of a team's favorite sports team, or those pertaining to an event such as a year-end holiday season.

For the apparatuses, methods, and non-transitory computer readable media disclosed herein, the aforementioned augmentations may be enabled using augmented reality. These augmentations may provide for the placement of virtual content in the real world as if the virtual content co-exists along with real-world objects. Features such as spatial mapping and occlusion may enhance the virtual realism of the augmented content. For example, overlaying happiness may induce virtual content on real-world walls, desks, a floor, etc.

As moods and emotions may play a critical role in the performance and contributions of project team members, the apparatuses, methods, and non-transitory computer readable media disclosed herein may provide for transformation of the ambient environment of a product developer, such as a software developer, using extended reality based augmentations for inducing positive emotions and a happy mood. The apparatuses, methods, and non-transitory computer readable media disclosed herein may implement a categorization based upon where such augmentations are placed and who decides to place them.

The apparatuses, methods, and non-transitory computer readable media disclosed herein may also include intelligence to react to changes in the context of the product developer so that the augmentations are best suited to improve the developer's inferred mental state. Other aspects such as undesirable side-effects (e.g., addiction, distraction, or motion sickness) that may be associated with some types of experiences may also be factored in the extended display that is generated.

The apparatuses, methods, and non-transitory computer readable media disclosed herein may be applied to a variety of domains and industries, such as for workers in the automotive industry, sales industry, and generally, any industry where workers' productivity may be influenced by their environment.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example extended reality based positive affect implementation for product development apparatus (hereinafter also referred to as "apparatus 100").

Referring to FIG. 1, the apparatus 100 may include a user analyzer 102 that is executed by at least one hardware processor (e.g., the hardware processor 902 of FIG. 9, and/or the hardware processor 1104 of FIG. 11) to determine, for a user 106 wearing or utilizing a device 126, characteristics 104 of the user 106.

An extended and immediate environment augmenter 110 that is executed by at least one hardware processor (e.g., the hardware processor 902 of FIG. 9, and/or the hardware processor 1104 of FIG. 11) may determine, based on the characteristics 104 and the environment 108 of the user 106, a plurality of augmentation elements 112 (e.g., from an augmentation elements repository 114). The extended and immediate environment augmenter 110 may generate a recommendation of a plurality of augmentation elements (e.g., recommended plurality of augmentation elements 130) from the determined plurality of augmentation elements 112. The extended and immediate environment augmenter 110 may render, based on selection of at least one augmentation element 116 from the recommended plurality of augmentation elements 130, the at least one augmentation element 116 in an extended environment 118 and/or an immediate environment 120 of the user 106. The extended environment 118 may include, for example, ceilings, hallways, etc., related to a position of the user 106, whereas an immediate environment 120 may include, for example, a desk, a computer, etc., of the user 106. The extended environment 118 and the immediate environment 120 may be included in the overall environment 108 of the user 106.

An interaction controller 122 that is executed by at least one hardware processor (e.g., the hardware processor 902 of FIG. 9, and/or the hardware processor 1104 of FIG. 11) may control interaction of the user 106 with the at least one rendered augmentation element 116.

A feedback analyzer 124 that is executed by at least one hardware processor (e.g., the hardware processor 902 of FIG. 9, and/or the hardware processor 1104 of FIG. 11) may analyze feedback of the user 106 with respect to the at least one rendered augmentation element 116.

According to examples disclosed herein, the user analyzer 102 may determine, for the user 106 wearing or utilizing the device, the characteristics 104 of the user 106 by determining, for the user 106 wearing or utilizing the device 126, the characteristics 104 that include psychographic attributes that include attitude and/or personality associated with the user 106, and social media profile attributes that include recurrent nouns, recurrent themes, and/or top memories associated with the user 106.

A similarity analyzer 128 that is executed by at least one hardware processor (e.g., the hardware processor 902 of FIG. 9, and/or the hardware processor 1104 of FIG. 11) may compare the characteristics 104 of the user 106 to characteristics of previous users. The similarity analyzer 128 may refine, based on the comparison of the characteristics 104 of the user 106 to the characteristics of previous users, the recommendation of the plurality of augmentation elements from the determined plurality of augmentation elements 112.

According to examples disclosed herein, the similarity analyzer 128 may compare the interaction of the user 106 with the at least one rendered augmentation element 116 to interactions of previous users. Further, the similarity analyzer 128 may refine, based on the comparison of the interactions of the user 106 with the at least one rendered augmentation element 116 to the interactions of previous users, the recommendation of the plurality of augmentation elements from the determined plurality of augmentation elements 112.

According to examples disclosed herein, the extended and immediate environment augmenter 110 may generate the recommendation of the plurality of augmentation elements from the determined plurality of augmentation elements 112 by determining, based on recurrent nouns, recurrent themes, and/or top memories associated with the user 106, a likelihood of an augmentation element from the plurality of augmentation elements being shown to the user 106. The extended and immediate environment augmenter 110 may rank the plurality of augmentation elements from the determined plurality of augmentation elements in descending order of most likely of being shown to the user 106. The extended and immediate environment augmenter 110 may generate the recommendation to include the ranked plurality of augmentation elements from the determined plurality of augmentation elements 112.

According to examples disclosed herein, the user analyzer 102 may determine the environment 108 of the user 106 by generating a three-dimensional (3D) spatial map of the environment 108 of the user 106 to identify environment features. Further, the user analyzer 102 may generate two-dimensional (2D) images of the environment 108 of the user 106 to verify the identification of environment features based on the 3D spatial map of the environment 108.

According to examples disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by analyzing a gaze of the user 106 with respect to environment features in the environment 108 of the user 106. The extended and immediate environment augmenter 110 may rank, based on the analysis of the gaze of the user 106, the environment features in decreasing order of gaze frequency. The extended and immediate environment augmenter 110 may render, based on selection of the at least one augmentation element 116 from the recommended plurality of augmentation elements 130, the at least one augmentation element 116 on a highest ranked environment feature from the ranked environment features.

According to examples disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by analyzing an element-feature weighted bipartite graph that includes links between the determined plurality of augmentation elements and environment features of the environment 108 of the user 106. The extended and immediate environment augmenter 110 may weight the links based on a number times a combination of an augmentation element 116 and an environment feature has occurred. The extended and immediate environment augmenter 110 may render, based on selection of the at least one augmentation element 116 from the recommended plurality of augmentation elements, the at least one augmentation element 116 with an associated environment feature based on a highest weight link selected from links between the at least one augmentation element 116 and associated environment features.

According to examples disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by analyzing a ranked list of environment features that is ranked based on where the at least one augmentation element 116 can reside. The extended and immediate environment augmenter 110 may identify an environment feature from the ranked list of environment features where the at least one augmentation element 116 does not occlude the identified environment feature. The extended and immediate environment augmenter 110 may render, based on selection of the at least one augmentation element 116 from the recommended plurality of augmentation elements 130, the at least one augmentation element 116 relative to the identified environment feature.

According to examples disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by identifying a size of an environment feature, from the environment 108 of the user 106, relative to which the at least one augmentation element 116 is rendered. The extended and immediate environment augmenter 110 may modify, based on the size of the environment feature, a size of the at least one augmentation element 116. Further, the extended and immediate environment augmenter 110 may render, based on selection of the at least one augmentation element 116 from the recommended plurality of augmentation elements, the at least one augmentation element 116 based on the modified size of the at least one augmentation element 116.

According to examples disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by identifying a color of an environment feature, from the environment 108 of the user 106, relative to which the at least one augmentation element 116 is rendered. The extended and immediate environment augmenter 110 may modify, based on the color of the environment feature, a color of the at least one augmentation element 116 to contrast with the color of the environment feature. The extended and immediate environment augmenter 110 may render, based on selection of the at least one augmentation element 116 from the recommended plurality of augmentation elements, the at least one augmentation element 116 based on the modified color of the at least one augmentation element 116.

According to examples disclosed herein, the interaction controller 122 may control interaction of the user 106 with the at least one rendered augmentation element 116, and the feedback analyzer 124 may analyze feedback of the user 106 with respect to the at least one rendered augmentation element 116 by determining the interaction that includes a gesture performed by the user 106. The interaction controller 122 may control, based on the gesture performed by the user 106, the interaction of the user 106 with the at least one rendered augmentation element 116 by performing an action on the at least one rendered augmentation element 116. The interaction controller 122 may analyze the feedback of the user 106 based on a received response to the action performed on the at least one rendered augmentation element 116. Further, the interaction controller 122 may control, based on the analysis of the feedback, the interaction of the user 106 with the at least one rendered augmentation element 116 by performing another action on the at least one rendered augmentation element 116.

According to examples disclosed herein, the feedback analyzer 124 may analyze the feedback of the user 106 based on the received response to the action performed on the at least one rendered augmentation element 116 by analyzing the feedback of the user 106 based on the received response that includes a change in a sentiment of the user 106.

According to examples disclosed herein, the feedback analyzer 124 may analyze the feedback of the user 106 based on the received response to the action performed on the at least one rendered augmentation element 116 by analyzing the feedback of the user 106 based on the received response that includes another action performed on the at least one rendered augmentation element 116.

According to examples disclosed herein, the feedback analyzer 124 may analyze the feedback of the user 106 based on the received response to the action performed on the at least one rendered augmentation element 116 by analyzing the feedback of the user 106 based on the received response that includes a negative sentiment associated with the user 106. In this regard, a user permissions controller 132 that is executed by at least one hardware processor (e.g., the hardware processor 902 of FIG. 9, and/or the hardware processor 1104 of FIG. 11) may modify, based on the negative sentiment associated with the user 106, a permission authorizing the user 106 to perform a specified task.

Operations of the apparatus 100 are described in further detail with reference to FIGS. 1-8.

Figure 2:
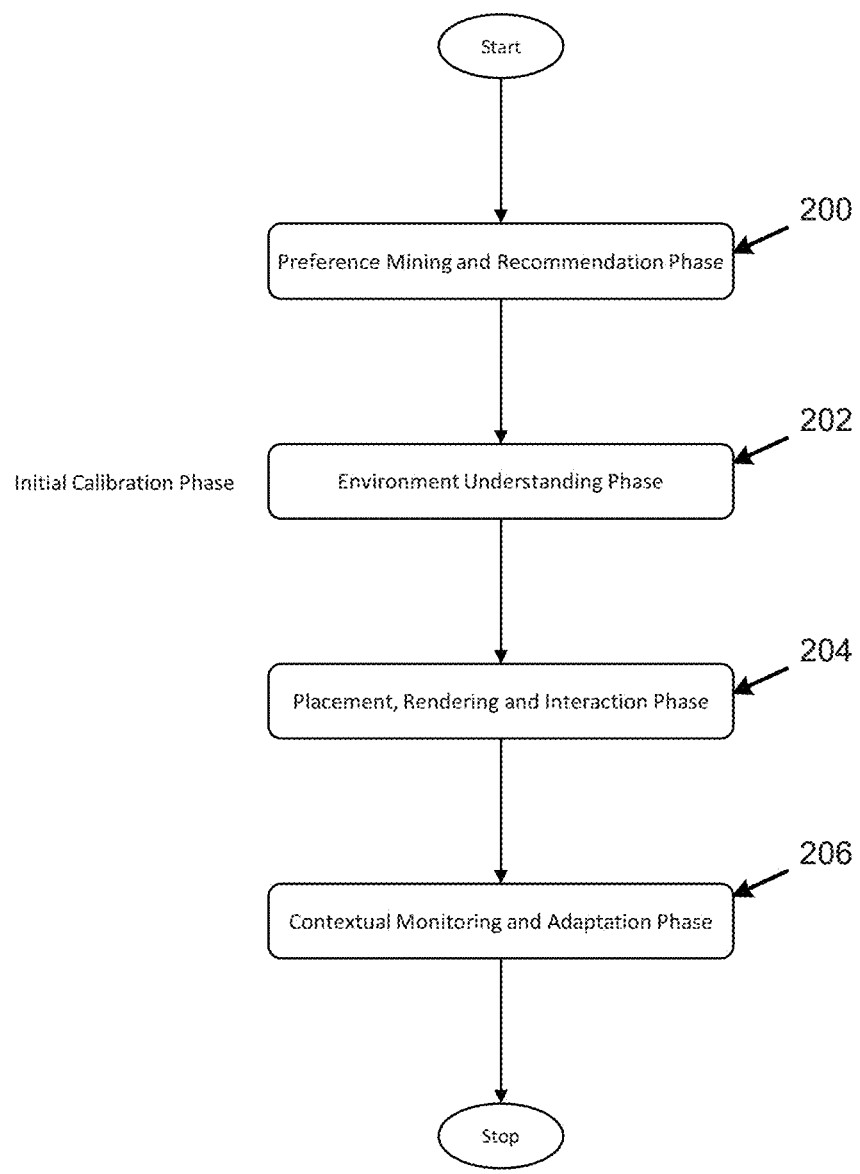
FIG. 2 illustrates a logical flow of phases associated with operation of the extended reality based positive affect implementation for product development apparatus of FIG. 1 in accordance with an example of the present disclosure.

FIG. 2 illustrates a logical flow of phases associated with operation of the apparatus 100 in accordance with an example of the present disclosure.

Referring to FIG. 2, operation of the apparatus 100 may include phases that include a preference mining and recommendation phase 200, an environment understanding phase 202 (which may include an initial calibration phase), a placement, rendering, and interaction phase 204, and a contextual monitoring and adaptation phase 206. Each of these phases is described in further detail below with reference to FIGS. 3-6.

Figure 3:
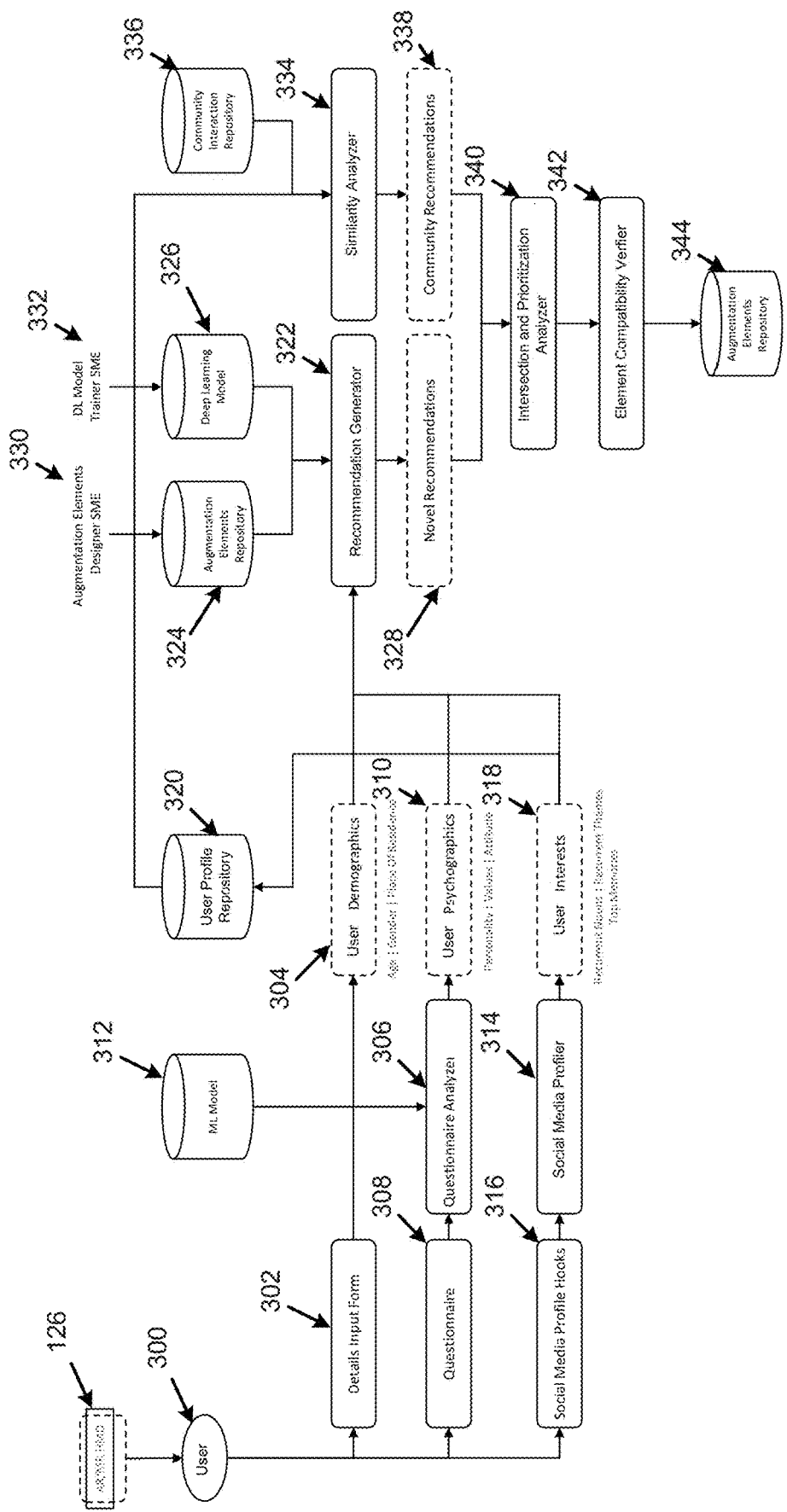
FIG. 3 illustrates a preference mining and recommendation phase flow to illustrate operation of the extended reality based positive affect implementation for product development apparatus of FIG. 1 in accordance with an example of the present disclosure.

FIG. 3 illustrates a preference mining and recommendation phase flow to illustrate operation of the apparatus 100 in accordance with an example of the present disclosure.

Referring to FIG. 3, with respect to the preference mining and recommendation phase 200, as disclosed herein, the user analyzer 102 may determine, for the user 106 wearing or utilizing the device, the characteristics 104 of the user 106 by determining, for the user 106 wearing or utilizing the device 126, the characteristics 104 that include psychographic attributes that include attitude and/or personality associated with the user 106, and social media profile attributes that include recurrent nouns, recurrent themes, and/or top memories associated with the user 106.

For example, for the user 106 at 300 wearing or utilizing the device 126, the user analyzer 102 may determine characteristics of the user from a details input form 302 to determine user demographics 304. For example, the demographics may include age, gender, place of residence etc., with respect to the user 106.

A questionnaire analyzer 306 of the user analyzer 102 may analyze a questionnaire 308 to determine user psychographics 310. For example, the psychographics may include the user's personality, values, attitude, etc. The questionnaire analyzer may receive input from a machine learning model 312. The machine learning applied at this stage may include applying a Deep Neural Network (DNN) on the questionnaire data from the questionnaire 308 to detect and classify the user's psychographic attributes (e.g., attitude, personality, family values, etc.).

A social media profiler 314 of the user analyzer 102 may analyze social media profile 316 to determine user interests 318 using social media profile hooks. For example, the social media profiling may include the user's recurrent nouns, recurrent themes, top memories, etc. The social media profile hooks may grant access to a user's social media profile using, for example, OAuth™. Once the access is granted, the user analyzer 102 may process the profile data (e.g., likes, follows, followers, uploaded images, tweets, comments, etc.) using natural language processing, digital image processing, and statistical analysis to determine a user's interests (e.g., recurrent nouns, themes, and top memories). The recurrent nouns may include nouns that are frequently referred by the user (e.g., dog, tree, country, beach, etc.). The recurrent themes may include themes that are frequently associated with the user (e.g., football, history, politics, art, etc.). Similarly, the top memories may include memories that are frequently associated with the user (e.g., birthdays, wedding, etc.).

The information from blocks 304, 310, and 318 may be fed to a user profile repository 320.

A recommendation generator 322, which may be a sub-component of the extended and immediate environment augmenter 110, may receive input from blocks 304, 310, and 318, and further from the augmentation elements repository 114 at block 324, and a deep learning model 326. At block 328, the recommendation generator 322 may generate a recommendation of the plurality of augmentation elements 130. The recommendation generator 322 may utilize user demographics 304, user psychographics 310, and user interests 318 as inputs, and recommend specific augmentation elements 112 at block 328 that are most optimal to be shown to the user 106 for implementing positive effects. The recommendation generator 322 may utilize the deep neural network 326 for this recommendation. The augmentation elements 112 may be selected from the augmentation elements repository 114 at 324. The augmentation elements repository 114 at 324, and the deep learning model 326 may respectively receive input from augmentation elements designer subject matter expert at 330, and a deep learning trainer subject matter expert at 332. The augmentation elements repository 114 at 324 may be a repository of preconfigured elements. The augmentation elements repository 114 may be populated by an augmentation elements designer subject matter expert at 330. The deep learning trainer subject matter expert at 332 may train the deep neural network model 326, which may be used for recommendation purposes. The deep neural network model 326 may represent a continuous learning model, which may continue to update itself as and when additional data is received.

As disclosed herein, the similarity analyzer 128 may compare the characteristics 104 of the user 106 to characteristics of previous users. The similarity analyzer 128 may refine, based on the comparison of the characteristics 104 of the user 106 to the characteristics of previous users, the recommendation of the plurality of augmentation elements from the determined plurality of augmentation elements 112. Further, the similarity analyzer 128 may compare the interaction of the user 106 with the at least one rendered augmentation element 116 to interactions of previous users. In this regard, the similarity analyzer 128 may refine, based on the comparison of the interactions of the user 106 with the at least one rendered augmentation element 116 to the interactions of previous users, the recommendation of the plurality of augmentation elements from the determined plurality of augmentation elements 112.

For example, at block 334, the similarity analyzer 128 may determine a similarity between data from the user profile repository 320 and a community interaction repository 336 to generate community recommendations 338. The similarity analyzer 128 at block 334 may utilize the user profile repository 320 to determine the similarity between the current user and previous users. This allows the similarity analyzer 128 to recommend elements that were recommended to similar users in the past. Also, another input utilized by the similarity analyzer 128 may include the community interaction repository 336 that includes information about which elements were shown to which users in the past, and how well they reacted to those (e.g., how many times they gazed, how many times interacted, how many times removed, etc.). This allows the similarity analyzer 128 to further refine the augmentation elements 112 to provide the most relevant recommendations at block 338.

As disclosed herein, the recommendation generator 322 (e.g., a sub-component of the extended and immediate environment augmenter 110) may generate the recommendation of the plurality of augmentation elements from the determined plurality of augmentation elements 112 by determining, based on recurrent nouns, recurrent themes, and/or top memories associated with the user 106, a likelihood of an augmentation element from the plurality of augmentation elements being shown to the user 106. The recommendation generator 322 of the extended and immediate environment augmenter 110 may rank the plurality of augmentation elements from the determined plurality of augmentation elements in descending order of most likely of being shown to the user 106. The recommendation generator 322 of the extended and immediate environment augmenter 110 may generate the recommendation to include the ranked plurality of augmentation elements from the determined plurality of augmentation elements 112.

For example, the recommendation of a plurality of augmentation elements 112 from 328 and the community recommendations 338 may be analyzed by an intersection and prioritization analyzer 340 and an element compatibility verifier 342 (which may be sub-components of the extended and immediate environment augmenter 110) to determine augmentation elements that may be placed in a reduced augmentation elements repository at 344, compared to the initial augmentation elements repository 114 at 324. The reduced augmentation elements repository at 344 may be updated only if the recommendation generator 322 and the similarity analyzer 128 process new information to determine another augmentation element from the augmentation elements repository 114 at 324 to be shown to the user 106, which was not previously shown. The intersection and prioritization analyzer 340 may combine the output from the recommended specific augmentation elements 112 at block 328 and community recommendations 338 to create one set, and prioritize the augmentation elements in that set in descending order of "most likelihood" of being shown to the user 106. This prioritization may be based upon the user's interests (e.g., recurrent nouns, recurrent themes, and top memories). The element compatibility verifier 342 may determine if the augmentation elements in the intersection set at 340 are compatible with the user's head-mounted display (AR) device that he/she is wearing. For example, some devices may not support 3D models of particular complexity (e.g., high polygon count). Hence, the element compatibility verifier 342 may eliminate the non-compatible augmentation elements and append the final remaining compatible augmentation elements at 344.

Figure 4:
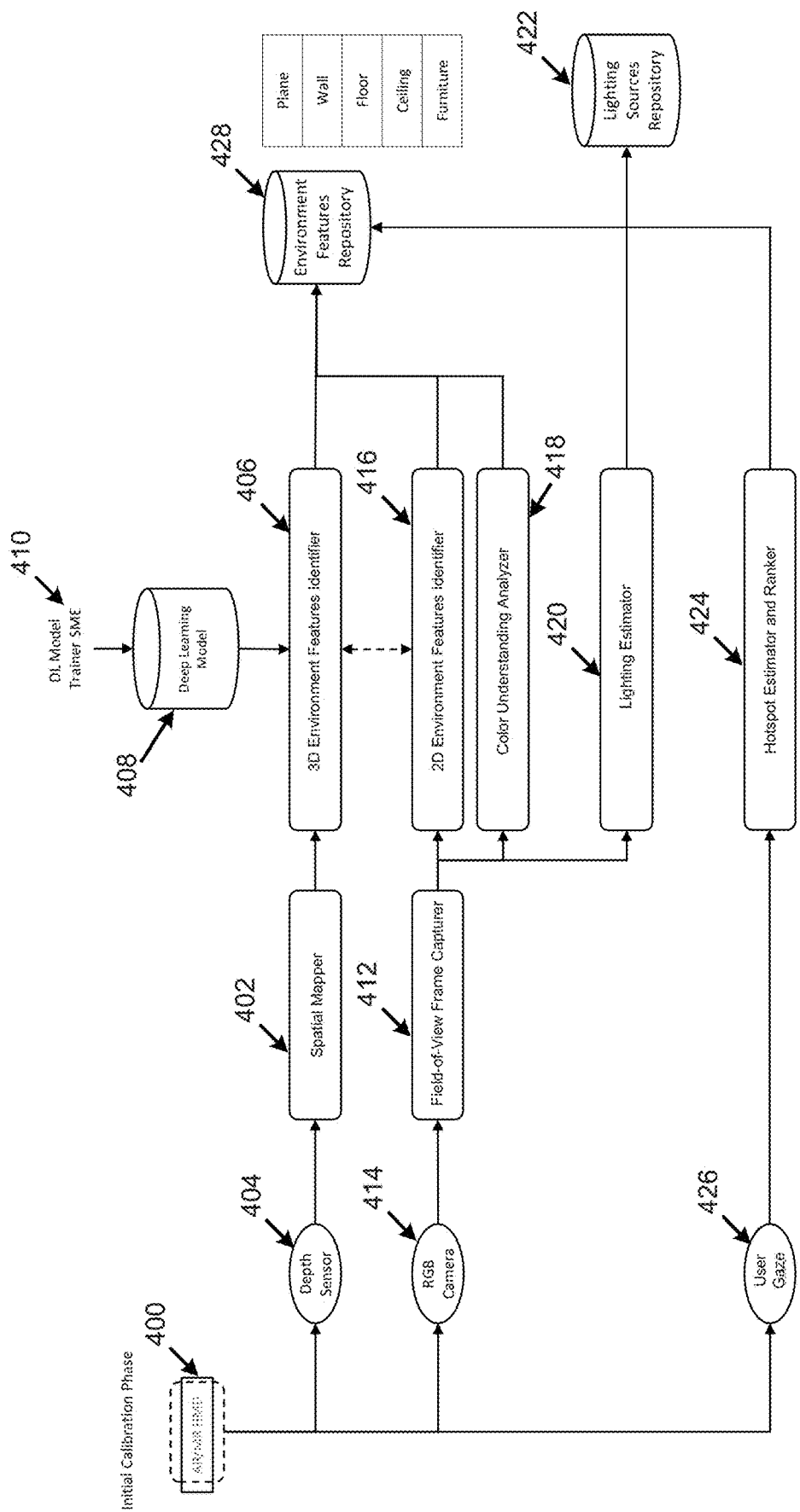
FIG. 4 illustrates an environment understanding phase flow to illustrate operation of the extended reality based positive affect implementation for product development apparatus of FIG. 1 in accordance with an example of the present disclosure.

FIG. 4 illustrates the environment understanding phase flow to illustrate operation of the apparatus 100 in accordance with an example of the present disclosure.

Referring to FIG. 4, with respect to the environment understanding phase flow 202, for the device 126 worn or otherwise utilized by the user 106 at 400, a spatial mapper 402 of the user analyzer 102 may utilize a depth sensor 404 for a three-dimensional (3D) environment features identifier 406 of the user analyzer 102. Thus, the 3D environment features identifier 406 may identify 3D features being viewed by the device 126.

As disclosed herein, the user analyzer 102 may determine the environment 108 of the user 106 by generating a 3D spatial map of the environment 108 of the user 106 to identify environment features. Further, the user analyzer 102 may generate two-dimensional (2D) images of the environment 108 of the user 106 to verify the identification of environment features based on the 3D spatial map of the environment 108.

For example, the 3D environment features identifier 406 (which may be a sub-component of the user analyzer 102) may receive information from a deep learning model 408, which may further receive information from a deep learning model trainer subject matter expert at 410. The 3D environment features identifier 406 may utilize the deep learning model 408 to identify multiple environment features such as a plane, wall, floor, furniture, etc., using the spatial mesh of the environment provided by the spatial mapper 402 of the user analyzer 102. The 3D environment features identifier 406 may also determine and store the size (e.g., coordinate system) of the detected environment feature. The deep learning model 408 may be trained by the deep learning model trainer subject matter expert at 410 who may utilize existing data sets to train the deep learning model 408. The finally extracted features, and associated attributes such as size, may be saved in the environment features repository 428.

For the device 126 worn or otherwise utilized by the user 106 at 400, a field-of-view frame capturer 412 of the user analyzer 102 may utilize a red-green-blue (RGB) camera 414 for a 2D environment features identifier 416 (which may be a sub-component of the user analyzer 102). The information from the field-of-view frame capturer 412 may be received by a color understanding analyzer 418 and a lighting estimator 420. A lighting estimate determined by the lighting estimator 420 may be sent to a lighting sources repository 422. The 2D environment features identifier 416 may perform the similar task as the 3D environment features identifier 406, but operate on 2D images for identifying environment features, as opposed to the 3D mesh used by the 3D environment features identifier 406. These images may be captured by the RGB camera 414. This step may provide for an increase in the accuracy of identification, by using two components (e.g., the 3D environment features identifier 406 and the 2D environment features identifier 416). The color understanding analyzer 418 may utilize RGB 2D images from block 412, and for every environment feature in the environment features repository 428, the color understanding analyzer 418 may identify its color scheme (e.g., the wall is white, the chair is black, etc.). Further, the lighting estimator 420 may utilize RGB 2D images from block 412, and digital image processing techniques to identify various lighting sources in the room. When identified, these lighting sources may be saved in the lighting sources repository 422. These lighting sources may subsequently be used by the shadow renderer 520 to cast realistic shadows on the augmented element.

As disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by analyzing a gaze of the user 106 with respect to environment features in the environment 108 of the user 106. The extended and immediate environment augmenter 110 may rank, based on the analysis of the gaze of the user 106, the environment features in decreasing order of gaze frequency. The extended and immediate environment augmenter 110 may render, based on selection of the at least one augmentation element 116 from the recommended plurality of augmentation elements 130, the at least one augmentation element 116 on a highest ranked environment feature from the ranked environment features.

For example, for the device 126 worn or otherwise utilized by the user 106 at 400, a hotspot estimator and ranker 424 of the extended and immediate environment augmenter 110 may utilize a user gaze 426 to identify and rank hotspots. The hotspot estimator and ranker 424 may track the user's gaze for a set period (e.g., t days, or n minutes). In the set period, the hotspot estimator and ranker 424 may analyze the environment features that the user gazes/looks at the most (e.g., the user's desk, the floor near the user's desk, a particular window, etc.). Depending upon the recorded frequency of these gazes, the hotspot estimator and ranker 424 may rank the environment features from the environment features repository 428 in decreasing order of gaze frequency. This ranking may subsequently be used at block 406 to determine the environment feature on which the augmented element would reside. The environment feature highest in the environment features repository 428 may be prioritized first. The information in the environment features repository 428 may include identification of features such as a plane, wall, floor, ceiling, furniture, etc., being viewed by the device 126.

Figure 5:
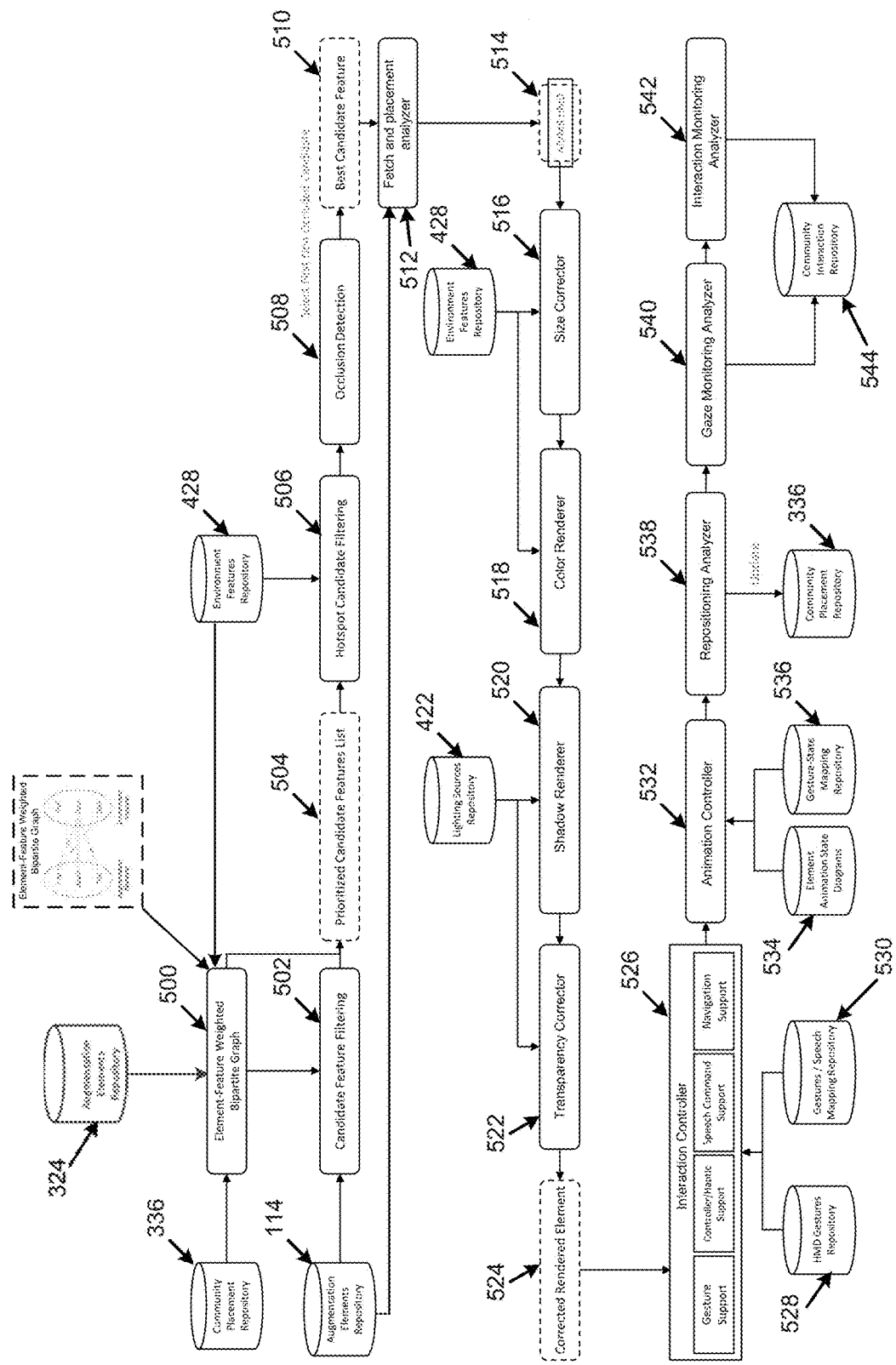
FIG. 5 illustrates a placement, rendering, and interaction phase flow to illustrate operation of the extended reality based positive affect implementation for product development apparatus of FIG. 1 in accordance with an example of the present disclosure.

FIG. 5 illustrates the placement, rendering, and interaction phase flow to illustrate operation of the apparatus 100 in accordance with an example of the present disclosure.

As disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by analyzing an element-feature weighted bipartite graph 500 that includes links between the determined plurality of augmentation elements and environment features of the environment 108 of the user 106. The extended and immediate environment augmenter 110 may weight the links based on a number times a combination of an augmentation element 116 and an environment feature has occurred. The extended and immediate environment augmenter 110 may render, based on selection of the at least one augmentation element 116 from the recommended plurality of augmentation elements, the at least one augmentation element 116 with an associated environment feature based on a highest weight link selected from links between the at least one augmentation element 116 and associated environment features.

For example, referring to FIG. 5, with respect to the placement, rendering, and interaction phase 204, information from the community placement repository 336 may be utilized by the element-feature weighted bipartite graph 500. The element-feature weighted bipartite graph 500 may receive a list of the augmentation elements from the augmentation elements repository 324, and a list of all the possible environment features from the environment features repository 428. The augmentation elements from the augmentation elements repository 324 may be mapped to link to the environment features from the environment features repository 428. The links may represent which augmentation element can reside on which feature. Further, depending upon the usage statistics of all users from the community placement repository 336, weights on these links may represent how many times this combination has appeared before.

Candidate feature filtering 502 may receive as input the augmentation elements that need to be shown to the user, and utilize the element-feature weighted bipartite graph 500 to determine a prioritized candidate features list 504 where the corresponding augmentation element may reside. The prioritized candidate features list 504 may be prioritized with respect to the weights of the links in the element-feature weighted bipartite graph 500. Thus, information from the element-feature weighted bipartite graph 500 and the augmentation elements repository 114 may be utilized by candidate feature filtering 502, and may be further utilized to generate the prioritized candidate features list 504.

As disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by analyzing a ranked list of environment features that is ranked based on where the at least one augmentation element 116 can reside. The extended and immediate environment augmenter 110 may identify an environment feature from the ranked list of environment features where the at least one augmentation element 116 does not occlude the identified environment feature. The extended and immediate environment augmenter 110 may render, based on selection of the at least one augmentation element 116 from the recommended plurality of augmentation elements 130, the at least one augmentation element 116 relative to the identified environment feature.

Figure 7:
FIG. 7 illustrates interactive pets and mixed reality to illustrate operation of the extended reality based positive affect implementation for product development apparatus of FIG. 1 in accordance with an example of the present disclosure.

For example, the prioritized candidate features list 504 and information from the environment features repository 428 may be utilized for hotspot candidate filtering 506 for occlusion detection 508. The occlusion detection may take as input the hotspot candidates where the augmentation element can reside. The occlusion detection 508 may then determine if the particular environment feature is occluded from the user's position (for example, a furniture item is between the user and the environment feature). The first non-occluded candidate may be selected as the best candidate feature and the augmentation element may be placed on it by a fetch and placement analyzer 512 (e.g., placing a virtual dog (augmentation element) on top of the user's desk (environment feature) as shown in FIG. 7).

A first non-occluded candidate may be selected to generate a best candidate feature 510, which may be sent to the fetch and placement analyzer 512. The fetch and placement analyzer 512 may fetch the virtual 3D model from the augmentation elements repository 114, and place the virtual 3D model at the center of the environment feature (e.g., best candidate).

As disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by identifying a size of an environment feature, from the environment 108 of the user 106, relative to which the at least one augmentation element 116 is rendered. The extended and immediate environment augmenter 110 may modify, based on the size of the environment feature, a size of the at least one augmentation element 116. Further, the extended and immediate environment augmenter 110 may render, based on selection of the at least one augmentation element 116 from the recommended plurality of augmentation elements, the at least one augmentation element 116 based on the modified size of the at least one augmentation element 116.

Further, as disclosed herein, the extended and immediate environment augmenter 110 may render, based on selection of the at least one augmentation element 116 from the recommended plurality of augmentation elements 130, the at least one augmentation element 116 in the extended environment 118 and/or the immediate environment 120 of the user 106 by identifying a color of an environment feature, from the environment 108 of the user 106, relative to which the at least one augmentation element 116 is rendered. The extended and immediate environment augmenter 110 may modify, based on the color of the environment feature, a color of the at least one augmentation element 116 to contrast with the color of the environment feature. The extended and immediate environment augmenter 110 may render, based on selection of the at least one augmentation element 116 from the recommended plurality of augmentation elements, the at least one augmentation element 116 based on the modified color of the at least one augmentation element 116.

For example, the device 126 worn or otherwise utilized by the user 106 at 514, information from the environment features repository 428 may be utilized by a size corrector 516 and a color renderer 518. The size corrector 516 may modify the size of the rendered element in accordance with the size of the environment feature from the environment features repository 428 on which it is placed. For example, the augmented dog of FIG. 7 should not be bigger than the desk itself, or an augmented tree should go beyond the ceiling of the environment.

The color renderer 518 may modify the color of the rendered element so that it is in contrast with the color of the environment feature. Thus, the colors of the rendered element and the environment feature may be different to increase visibility and comprehension.

Information from the lighting sources repository 422 may be used by a shadow renderer 520 and a transparency corrector 522 to determine a corrected rendered element 524. The shadow renderer 520 may utilize the lighting sources data from the lighting sources repository 422 to cast a realistic (but virtual) shadow on the rendered element, to make the rendered element look more realistic and help it blend better with the physical environment.

The transparency corrector 522 may fix the transparency levels of the augmented element to blend in with the physical ambient light. If the light is more, the transparency levels should be less, and vice-versa.

The corrected rendered element 524 may represent the final rendered element, after applying all the corrections from blocks 512, 518, 520, and 522.

As disclosed herein, the interaction controller 122 may control interaction of the user 106 with the at least one rendered augmentation element 116, and the feedback analyzer 124 may analyze feedback of the user 106 with respect to the at least one rendered augmentation element 116 by determining the interaction that includes a gesture performed by the user 106. The interaction controller 122 may control, based on the gesture performed by the user 106, the interaction of the user 106 with the at least one rendered augmentation element 116 by performing an action on the at least one rendered augmentation element 116. The interaction controller 122 may analyze the feedback of the user 106 based on a received response to the action performed on the at least one rendered augmentation element 116. Further, the interaction controller 122 may control, based on the analysis of the feedback, the interaction of the user 106 with the at least one rendered augmentation element 116 by performing another action on the at least one rendered augmentation element 116.

As also disclosed herein, the feedback analyzer 124 may analyze the feedback of the user 106 based on the received response to the action performed on the at least one rendered augmentation element 116 by analyzing the feedback of the user 106 based on the received response that includes a change in a sentiment of the user 106.

Further, as disclosed herein, the feedback analyzer 124 may analyze the feedback of the user 106 based on the received response to the action performed on the at least one rendered augmentation element 116 by analyzing the feedback of the user 106 based on the received response that includes another action performed on the at least one rendered augmentation element 116.

For example, at 526, the interaction controller 122 may receive the corrected rendered element 524 and analyze it with respect to gesture support, haptic support, speech command support, and navigation support. With respect to block 526, after placement of the virtual augmented element in the user's field-of-view, the interaction controller 122 may allow the user 106 to interact with the augmentation element. At 526, the gesture support may provide for implementation of specific gestures such as finger air tap, hand swipe, etc. The head mounted display (HMD) gestures repository 528 may provide a mapping of different device-specific gestures to particular actions, and the gesture support may enable this action-gesture mapping. At 526, the controller/haptic support may utilize controllers and buttons on them, instead of gestures. The haptic support may map specific gestures/controller actions to specific haptics (if supported). For example, touching a dog gesture can enable the vibration sensation of the user's display device 126 to showcase a touch response. At 526, the speech command support may utilize speech commands to support speech-action mapping. For example, a speech command "Go away" might prompt the dog to move to a faraway environment feature. Further, at 526, the navigation support may allow the user 106 to move around the augmented element and perform a 360-degree comprehension. This type of walkaround navigation may facilitate comprehension (and believe in the existence) of the augmented element.

An animation controller 532 (e.g., a sub-component of the interaction controller 122), which may also be part of the interaction controller 122, may receive the gesture support, haptic support, speech command support, and navigation support information, and further, input from element animation state diagrams 534 and a gesture-state mapping repository 536, and forward animation control information to a repositioning analyzer 538. The animation controller

532 may render specific supported animations from the element animation state diagrams 534 on the augmented elements, in response to a particular gesture/interaction at 526 by the user. For example, touching a dog might prompt a lookback or cheerful bark by the augmented dog. The element action state diagram from the element animation state diagrams 534 may control the animation flow with respect to which animation occurs after another animation. The gesture-state mapping repository 536 may store the information about which animation to show for a particular augmentation element, in response to a particular gesture/interaction.

Information from the repositioning analyzer 538 may be sent to a gaze monitoring analyzer 540 and further to an interaction monitoring analyzer 542, which may each feed into a community interaction repository 544. The repositioning analyzer 538 may allow the user 106 to reposition the augmented element to a different position (e.g., environment feature) depending upon the user's liking and/or need. The repositioning data may be saved in the community placement repository 536 for improving recommendations for other users.

The gaze monitoring analyzer 540 may keep track of the user's gaze and how many times and for what duration the user's gaze is at the rendered augmentation element 116. The gaze data may be thereafter saved in the community placement repository 336 for improving recommendations for other users.

The interaction monitoring analyzer 542 may keep track of the user's interactions with the rendered augmentation element 116. Attributes that are tracked may include interaction mechanism, interaction frequency, interaction time, the recorded response by the rendered augmentation element 116, etc. The interaction data may be saved in the community placement repository 336 for improving recommendations for other users.

Figure 6:
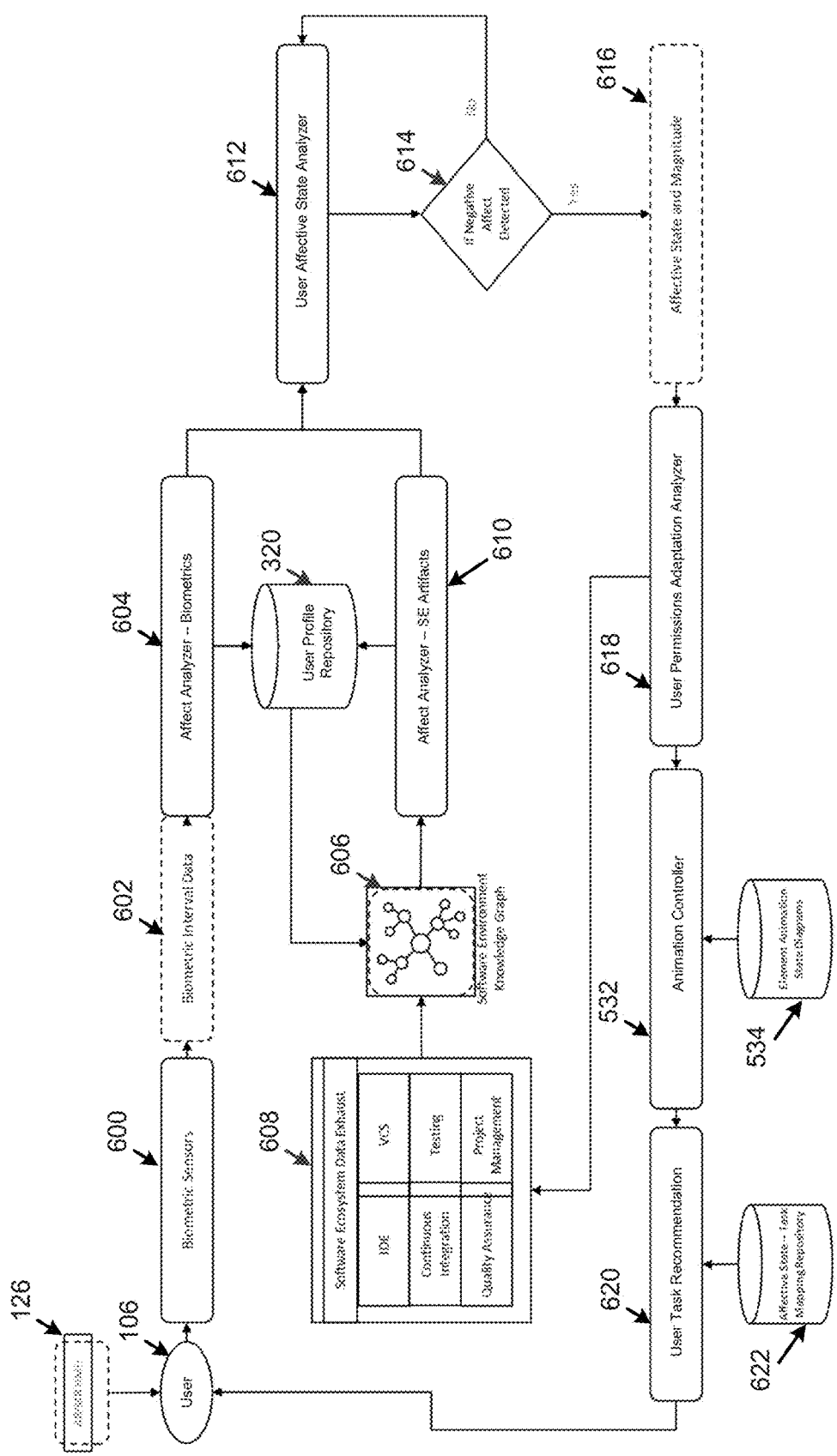
FIG. 6 illustrates a contextual monitoring and adaptation phase flow to illustrate operation of the extended reality based positive affect implementation for product development apparatus of FIG. 1 in accordance with an example of the present disclosure.

FIG. 6 illustrates a contextual monitoring and adaptation phase flow to illustrate operation of the apparatus 100 in accordance with an example of the present disclosure.

As disclosed herein, the feedback analyzer 124 may analyze the feedback of the user 106 based on the received response to the action performed on the at least one rendered augmentation element 116 by analyzing the feedback of the user 106 based on the received response that includes a negative sentiment associated with the user 106. In this regard, the user permissions controller 132 may modify, based on the negative sentiment associated with the user 106, a permission authorizing the user 106 to perform a specified task.

For example, referring to FIG. 6, with respect to the contextual monitoring and adaptation phase 206, for the device 126 worn by the user 106, biometric sensors 600 may be utilized to generate biometric interval data 602. The biometric interval data 602 may refer to a pre-specified fixed period at which the user vitals may be recorded. The pre-specified fixed period may vary depending upon the body vital being recorded, and the type of biometric sensor. Some types of biometric interval data 602 may be continuous (e.g., heart rate variability), and others may be discrete (e.g., body temperature). The biometric interval data 602 may be analyzed by a biometrics affect analyzer 604 to input to the user profile repository 320.

The biometrics affect analyzer 604 may receive as input the stream of body vitals for the user 106, and analyze this information for specific patterns or thresholds to determine the affective state of the user (e.g., happy, joy, sad, angry, stressed, etc.).

A software environment knowledge graph 606 may be generated from software ecosystem data exhaust 608. In this regard, the software ecosystem data exhaust 608 may include integrated development environment (IDE), version control system (VCE), continuous integration, testing, quality assurance, and project management. The software environment knowledge graph 606 may represent a modeled collection of all of the data residing in a software engineering environment. The software environment knowledge graph 606 may include entities (e.g., nodes) and relationships between them (e.g., edges). The software environment knowledge graph 606 may represent data from multiple sources and tools being deployed in a project environment represented by the software ecosystem data exhaust 608. For the software ecosystem data exhaust 608, IDE may represent a helper tool used to write and execute the code (e.g., Eclipse, Android Studio, etc.), and VCS may include a code repository and versioning system (e.g., Git, SVN, Mercurial, etc.).

A software engineering (SE) artifacts affect analyzer 610 may receive, as input, the software environment knowledge graph 606. The SE artifacts affect analyzer 610 may represent a collection of algorithms used to determine the user's affective state using software engineering data. For example sentiment analysis on code comments may reveal if a developer was happy, sad, angry, or stressed at the time of writing the comment.

A user affective state analyzer 612 may analyze input from the biometrics affect analyzer 604, and the SE artifacts affect analyzer 610. The user affective state analyzer 612 may continuously monitor incoming affective state data for the presence of a negative effect. In the case of a negative effect, the user affective state analyzer 612 may pass the context to an affective state and magnitude 616. In this regard, at 614, based on a determination that a negative affect is detected, the affective state and magnitude 616 may be generated and further input to a user permissions adaptation analyzer 618 (a sub-component of the user permissions controller 132). A negative affect may represent a negative emotion or mood, and may be determined as per the biometrics affect analyzer 604, or the SE artifacts affect analyzer 610. A sentiment analysis example is provided in the explanation above for detecting the presence of a negative effect. The sentiment score in the same case may provide the basis for determining the magnitude. For example, if the user (e.g., a developer) is stressed (e.g., negative affect), the magnitude for a very stressed situation may be 8 on a scale of 1 to 10.

A user permissions adaptation analyzer 618 may analyze the affective state and magnitude 616, and forward results of the analysis to the animation controller 532. The user permissions adaptation analyzer 618, depending upon the negative affect and a magnitude of the negative affect, may remove certain permissions for the user 106. For example, the user 106 may not be allowed to commit code to the central repository, because a negative affect may lead to poor quality code.

The animation controller 532 may receive, as input, element animation state diagrams 534. A user task recommendation 620 may be determined by the animation controller 532, which receives the element animation state diagrams 534, based on input from an affective state task mapping repository 622. For example, the affective state task mapping repository 622 may include a mapping between states of the user and tasks. The animation controller 532 may generate calming/happy animations configured on the augmented element, in an attempt to convert the user's negative affect to a positive affect (e.g., make the user feel happy again).

Figure 8:
FIG. 8 illustrates a nature theme applied to a product development team workspace to illustrate operation of the extended reality based positive affect implementation for product development apparatus of FIG. 1 in accordance with an example of the present disclosure.

As a final step, the recommended task per the user task recommendation 620, which may receive input from an affective state-task mapping repository 622, may be forwarded to the user 106. Depending upon the negative affect and its magnitude, the user task recommendation 620 may represent a specific task that is recommended to the user 106 in an attempt to convert the user's negative affect to a positive affect (e.g., make the user feel happy). For example, the recommended task per the user task recommendation 620 may include playing with a dog per FIG. 7, taking a walk through a virtual augmented park scene as shown in FIG. 8, etc. The task per the user task recommendation 620 may be forwarded to the user for execution, where the user affective state analyzer 612 may keep tracking the user's affective state, until the negative affect is neutralized.

Referring again to FIG. 1, according to an example, the apparatus 100 may be built utilize a MICROSOFT HOLO-LENS HMD. In this regard, interactions may be supported using gestures and voice commands.

According to an example, the apparatus 100 may include immediate augmentation including an interactive pet. In this regard, having pets at a workplace may reduce stress and have a positive effect on an employee's productivity and health. Utilization of real pets may include potential challenges such as allergies, potential bites, odor, cleanliness, etc. Moreover, all employees in a particular area may not equally support an initiative to have a real pet. In this regard, FIG. 7 illustrates interactive pets and mixed reality to illustrate operation of the apparatus 100 in accordance with an example of the present disclosure.

Referring to FIG. 7, a virtual interactive dog is shown in the field-of-view of a product developer. The example of FIG. 7 may represent immediate augmentation. In this regard, the product developer may choose the kind and breed of the pet to be overlaid on their work desk (e.g., a dog in this case). The product developer may leverage multiple gestures and voice commands to interact with the dog. For example, the product developer may move the dog to a different position, switch between multiple supported animations (e.g., play, walk, run), etc. While a pet-loving developer might find this calming and cheerful, it is completely up to the developer's discretion to use this feature (depending on their likes and dislikes). Also, the overall experience may be personal and limited to the developer who is wearing the HMD.

According to another example, the apparatus 100 may implement extended environment augmentation to implement a scenic view. In this regard, nature's contact at the workplace may help in reducing stress. For example, a workplace color scheme may have an impact on a worker's mood and productivity. However, incorporating such changes may not be feasible due to high cost and effort investments. In this regard, FIG. 8 illustrates a nature theme applied to a product development team workspace to illustrate operation of the apparatus 100 in accordance with an example of the present disclosure.

Referring to FIG. 8, multiple scenic elements may be spread across a developer's workplace (e.g., a park). These scenic elements may include virtual representations of trees, ponds, pebbles, etc. In this regard, taking a walk through a virtual park during short breaks may induce positive effects in a product developer. The example of FIG. 8 may provide an extended environment augmentation.

Figure 9:
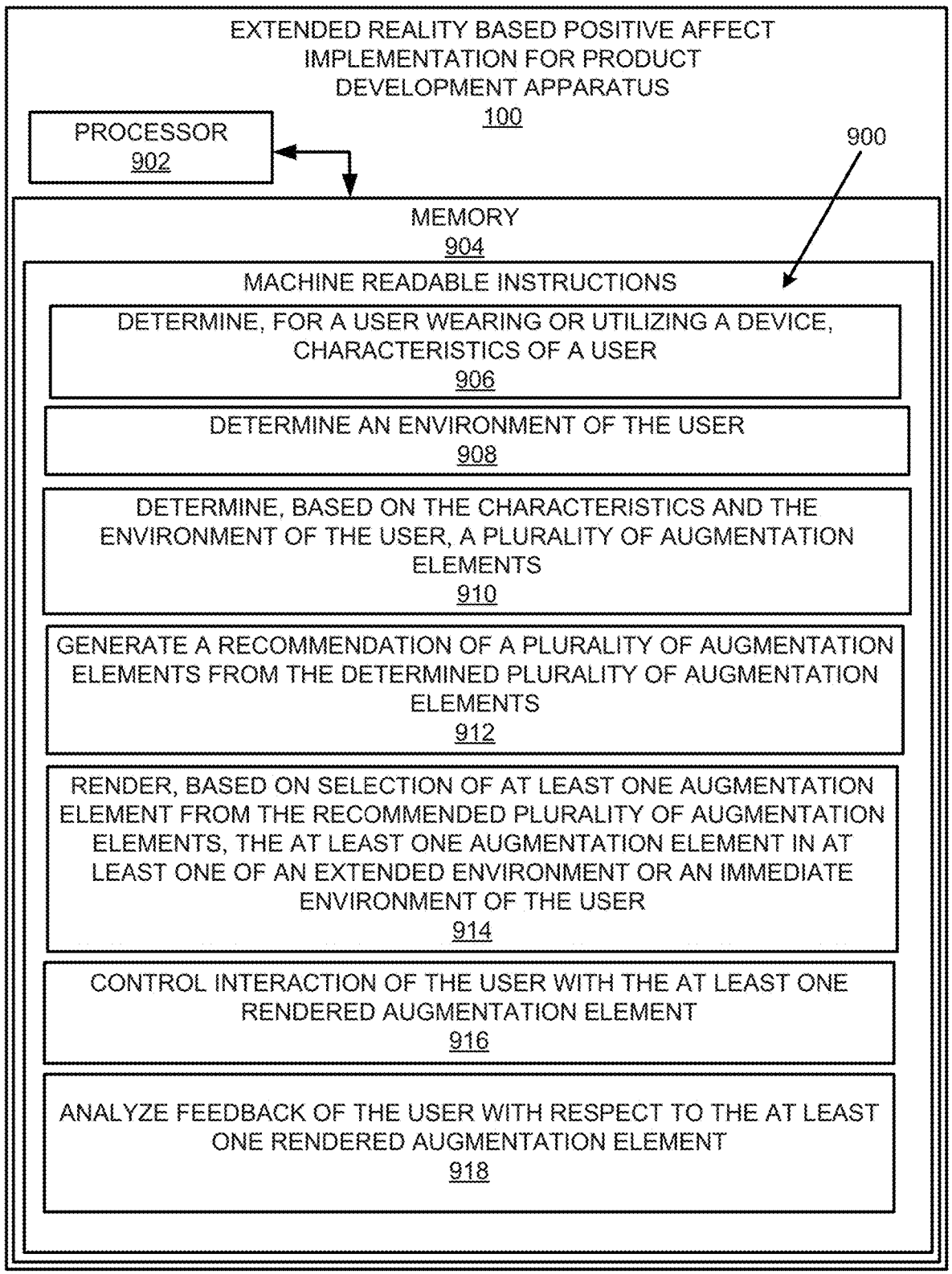
FIG. 9 illustrates an example block diagram for extended reality based positive affect implementation for product development in accordance with an example of the present disclosure.
Figure 10:
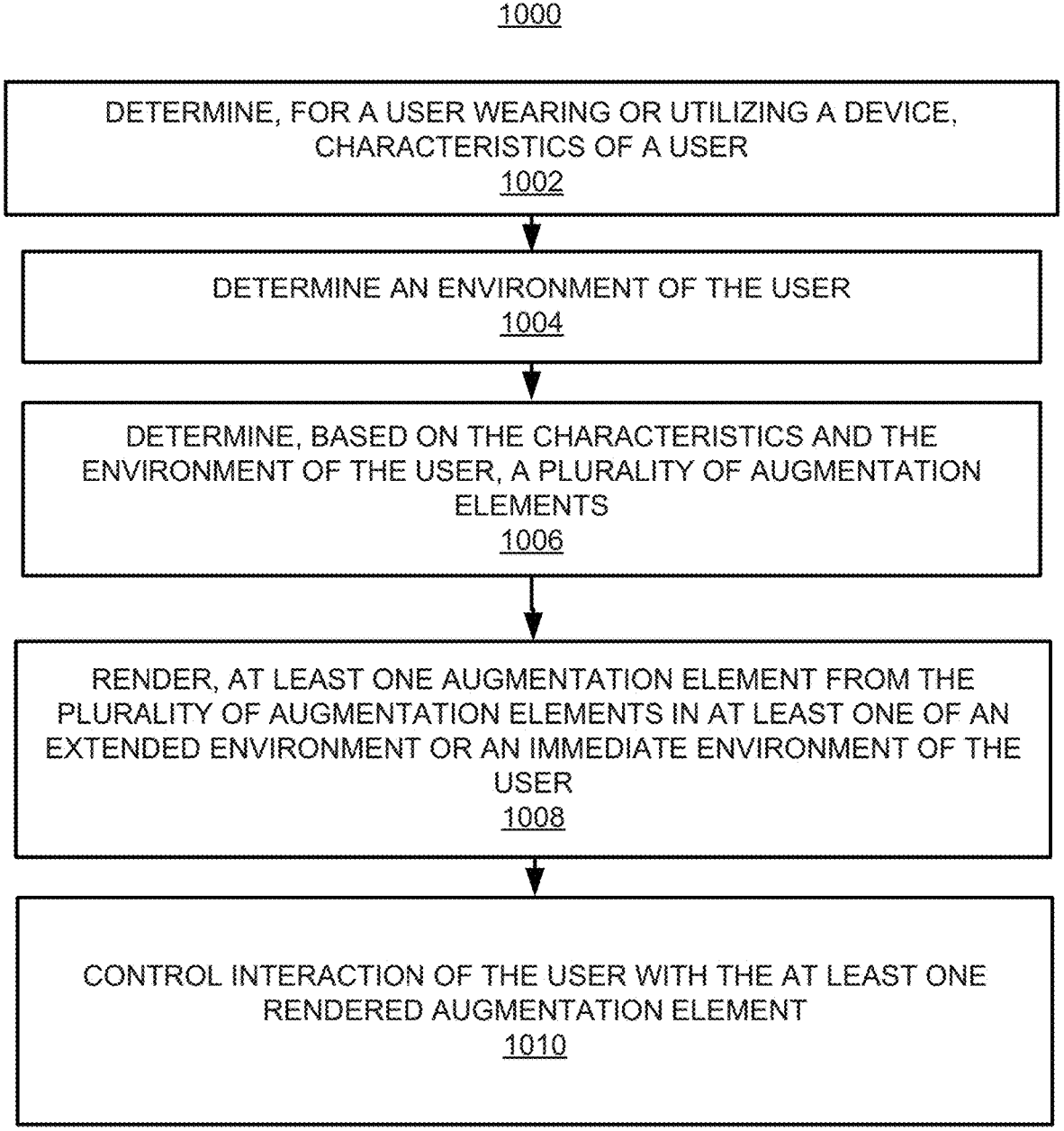
FIG. 10 illustrates a flowchart of an example method for extended reality based positive affect implementation for product development in accordance with an example of the present disclosure.
Figure 11:
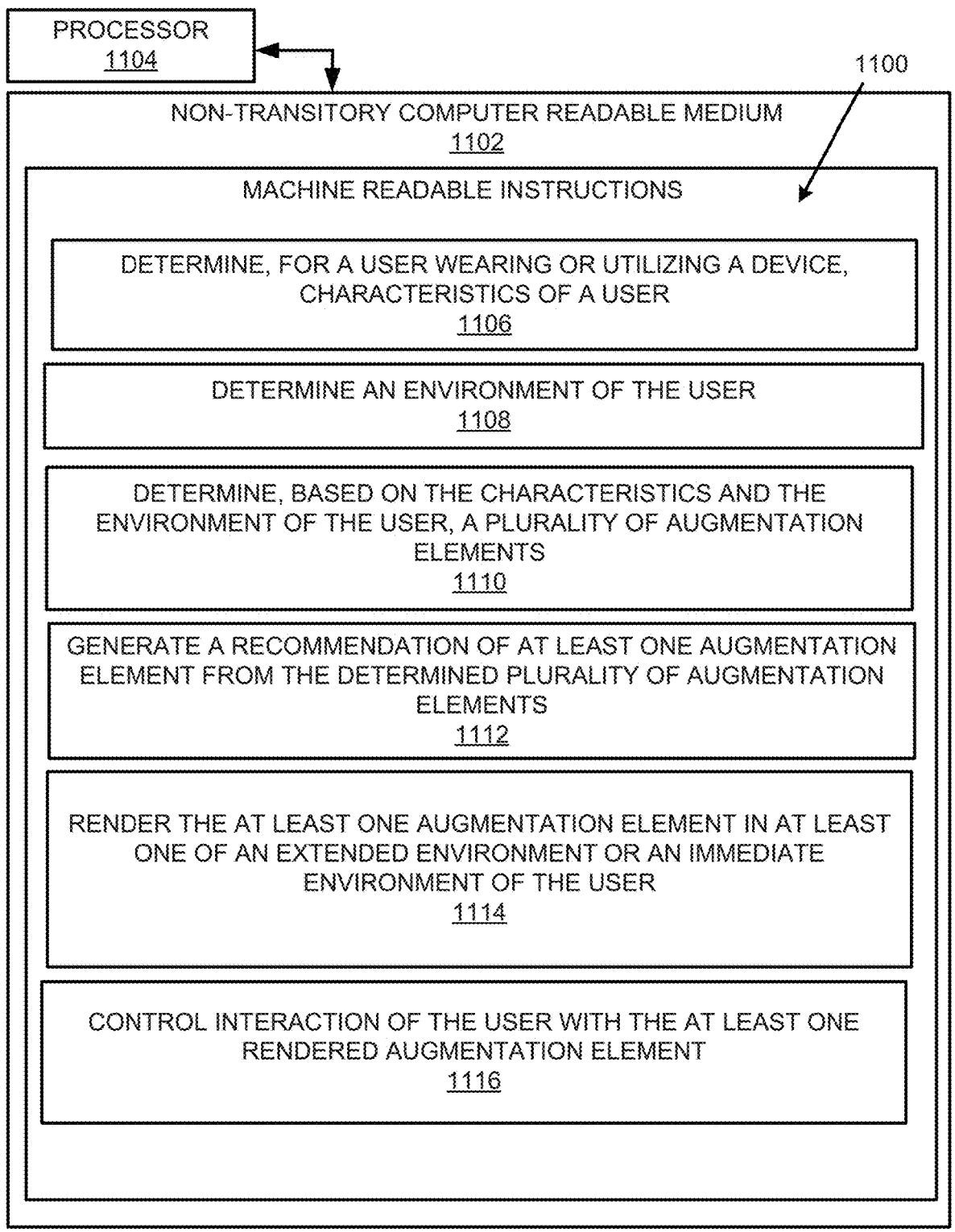
FIG. 11 illustrates a further example block diagram for extended reality based positive affect implementation for product development in accordance with another example of the present disclosure.

FIGS. 9-11 respectively illustrate an example block diagram 900, a flowchart of an example method 1000, and a further example block diagram 1100 for extended reality based positive affect implementation for product development, according to examples. The block diagram 900, the method 1000, and the block diagram 1100 may be implemented on the apparatus 100 described above with reference to FIG. 1 by way of example and not of limitation. The block diagram 900, the method 1000, and the block diagram 1100 may be practiced in other apparatus. In addition to showing the block diagram 900, FIG. 9 shows hardware of the apparatus 100 that may execute the instructions of the block diagram 900. The hardware may include a processor 902, and a memory 904 storing machine readable instructions that when executed by the processor cause the processor to perform the instructions of the block diagram 900. The memory 904 may represent a non-transitory computer readable medium. FIG. 10 may represent an example method for extended reality based positive affect implementation for product development, and the steps of the method. FIG. 11 may represent a non-transitory computer readable medium 1102 having stored thereon machine readable instructions to provide extended reality based positive affect implementation for product development according to an example. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to the block diagram 900 shown in FIG. 9, the memory 904 may include instructions 906 to determine, for a user wearing or utilizing a device 126, characteristics 104 of the user 106.

The processor 902 may fetch, decode, and execute the instructions 908 to determine an environment 108 of the user 106.

The processor 902 may fetch, decode, and execute the instructions 910 to determine, based on the characteristics 104 and the environment 108 of the user 106, a plurality of augmentation elements 112.

The processor 902 may fetch, decode, and execute the instructions 912 to generate a recommendation of a plurality of augmentation elements from the determined plurality of augmentation elements 112.

The processor 902 may fetch, decode, and execute the instructions 914 to render, based on selection of at least one augmentation element 96 from the recommended plurality of augmentation elements 130, the at least one augmentation element 116 in an extended environment 118 and/or an immediate environment 120 of the user 106.

The processor 902 may fetch, decode, and execute the instructions 916 to control interaction of the user 106 with the at least one rendered augmentation element 116.

The processor 902 may fetch, decode, and execute the instructions 918 to analyze feedback of the user 106 with respect to the at least one rendered augmentation element 116.

Referring to FIGS. 1-8 and 10, and particularly FIG. 10, for the method 1000, at block 1002, the method may include determining, for a user wearing or utilizing a device 126, characteristics 104 of a user 106.

At block 1004, the method may include determining an environment 108 of the user 106.

At block 1006, the method may include determining, based on the characteristics 104 and the environment 108 of the user 106, a plurality of augmentation elements 112.

At block 1008, the method may include rendering, at least one augmentation element 116 from the plurality of augmentation elements 112, in an extended environment 118 and/or an immediate environment 120 of the user 106.

At block 1010, the method may include controlling interaction of the user 106 with the at least one rendered augmentation element 116.

Referring to FIGS. 1-8 and 11, and particularly FIG. 11, for the block diagram 1100, the non-transitory computer readable medium 1102 may include instructions 1106 to determine, for a user wearing or utilizing a device 126, characteristics 104 of a user 106.

The processor 1104 may fetch, decode, and execute the instructions 1108 to determine an environment 108 of the user 106.

The processor 1104 may fetch, decode, and execute the instructions 1110 to determine, based on the characteristics 104 and the environment 108 of the user 106, a plurality of augmentation elements 112.

The processor 1104 may fetch, decode, and execute the instructions 1112 to generate a recommendation of at least one augmentation element 116 from the determined plurality of augmentation elements 112.

The processor 1104 may fetch, decode, and execute the instructions 1114 to render the at least one augmentation element 116 in an extended environment 118 and/or an immediate environment 120 of the user 106.

The processor 1104 may fetch, decode, and execute the instructions 1116 to control interaction of the user 106 with the at least one rendered augmentation element 116.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An extended reality based positive affect implementation for product development apparatus comprising:
   a user analyzer, executed by at least one hardware processor, to
      determine, for a user wearing or utilizing a device, characteristics of the user, and
      determine an environment of the user; and
   an extended and immediate environment augmenter, executed by the at least one hardware processor, to
      determine, based on the characteristics and the environment of the user, a plurality of augmentation elements,
      generate a recommendation of a plurality of augmentation elements from the determined plurality of augmentation elements, and
      render, based on selection of at least one augmentation element from the recommended plurality of augmentation elements, the at least one augmentation element in at least one of an extended environment or an immediate environment of the user;
   an interaction controller, executed by the at least one hardware processor, to
      control interaction of the user with the at least one rendered augmentation element; and
   a feedback analyzer, executed by the at least one hardware processor, to
      analyze feedback of the user with respect to the at least one rendered augmentation element.

2. The extended reality based positive affect implementation for product development apparatus according to claim 1, wherein the user analyzer is executed by the at least one hardware processor to determine, for the user wearing or utilizing the device, the characteristics of the user by:
   determining, for the user wearing or utilizing the device, the characteristics that include:
      psychographic attributes that include at least one of attitude or personality associated with the user; and
      social media profile attributes that include at least one of recurrent nouns, recurrent themes, or top memories associated with the user.

3. The extended reality based positive affect implementation for product development apparatus according to claim 1, further comprising:
   a similarity analyzer, executed by the at least one hardware processor, to
      compare the characteristics of the user to characteristics of previous users, and
      refine, based on the comparison of the characteristics of the user to the characteristics of previous users, the recommendation of the plurality of augmentation elements from the determined plurality of augmentation elements.

4. The extended reality based positive affect implementation for product development apparatus according to claim 1, further comprising:
   a similarity analyzer, executed by the at least one hardware processor, to
      compare the interaction of the user with the at least one rendered augmentation element to interactions of previous users, and
      refine, based on the comparison of the interactions of the user with the at least one rendered augmentation element to the interactions of previous users, the recommendation of the plurality of augmentation elements from the determined plurality of augmentation elements.

5. The extended reality based positive affect implementation for product development apparatus according to claim 1, wherein the extended and immediate environment augmenter is executed by the at least one hardware processor to generate the recommendation of the plurality of augmentation elements from the determined plurality of augmentation elements by:
   determining, based on at least one of recurrent nouns, recurrent themes, or top memories associated with the user, a likelihood of an augmentation element from the plurality of augmentation elements being shown to the user;

ranking the plurality of augmentation elements from the determined plurality of augmentation elements in descending order of most likely of being shown to the user; and generating the recommendation to include the ranked plurality of augmentation elements from the determined plurality of augmentation elements.

6. The extended reality based positive affect implementation for product development apparatus according to claim 1, wherein the user analyzer is executed by the at least one hardware processor to determine the environment of the user by:

generating a three-dimensional (3D) spatial map of the environment of the user to identify environment features; and generating two-dimensional (2D) images of the environment of the user to verify the identification of environment features based on the 3D spatial map of the environment.

7. The extended reality based positive affect implementation for product development apparatus according to claim 1, wherein the extended and immediate environment augmenter is executed by the at least one hardware processor to render, based on selection of the at least one augmentation element from the recommended plurality of augmentation elements, the at least one augmentation element in at least one of the extended environment or the immediate environment of the user by:

analyzing a gaze of the user with respect to environment features in the environment of the user;

ranking, based on the analysis of the gaze of the user, the environment features in decreasing order of gaze frequency; and rendering, based on selection of the at least one augmentation element from the recommended plurality of augmentation elements, the at least one augmentation element on a highest ranked environment feature from the ranked environment features.

8. The extended reality based positive affect implementation for product development apparatus according to claim 1, wherein the extended and immediate environment augmenter is executed by the at least one hardware processor to render, based on selection of the at least one augmentation element from the recommended plurality of augmentation elements, the at least one augmentation element in at least one of the extended environment or the immediate environment of the user by:

analyzing an element-feature weighted bipartite graph that includes links between the determined plurality of augmentation elements and environment features of the environment of the user;

weighting the links based on a number times a combination of an augmentation element and an environment feature has occurred; and rendering, based on selection of the at least one augmentation element from the recommended plurality of augmentation elements, the at least one augmentation element with an associated environment feature based on a highest weight link selected from links between the at least one augmentation element and associated environment features.

9. The extended reality based positive affect implementation for product development apparatus according to claim 1, wherein the extended and immediate environment augmenter is executed by the at least one hardware processor to render, based on selection of the at least one augmentation element from the recommended plurality of augmentation elements, the at least one augmentation element in at least one of the extended environment or the immediate environment of the user by:

analyzing a ranked list of environment features that is ranked based on where the at least one augmentation element can reside;

identifying an environment feature from the ranked list of environment features where the at least one augmentation element does not occlude the identified environment feature; and rendering, based on selection of the at least one augmentation element from the recommended plurality of augmentation elements, the at least one augmentation element relative to the identified environment feature.

10. The extended reality based positive affect implementation for product development apparatus according to claim 1, wherein the extended and immediate environment augmenter is executed by the at least one hardware processor to render, based on selection of the at least one augmentation element from the recommended plurality of augmentation elements, the at least one augmentation element in at least one of the extended environment or the immediate environment of the user by:

identifying a size of an environment feature, from the environment of the user, relative to which the at least one augmentation element is rendered;

modifying, based on the size of the environment feature, a size of the at least one augmentation element; and rendering, based on selection of the at least one augmentation element from the recommended plurality of augmentation elements, the at least one augmentation element based on the modified size of the at least one augmentation element.

11. The extended reality based positive affect implementation for product development apparatus according to claim 1, wherein the extended and immediate environment augmenter is executed by the at least one hardware processor to render, based on selection of the at least one augmentation element from the recommended plurality of augmentation elements, the at least one augmentation element in at least one of the extended environment or the immediate environment of the user by:

identifying a color of an environment feature, from the environment of the user, relative to which the at least one augmentation element is rendered;

modifying, based on the color of the environment feature, a color of the at least one augmentation element to contrast with the color of the environment feature; and rendering, based on selection of the at least one augmentation element from the recommended plurality of augmentation elements, the at least one augmentation element based on the modified color of the at least one augmentation element.

12. The extended reality based positive affect implementation for product development apparatus according to claim 1, wherein the interaction controller is executed by the at least one hardware processor to control interaction of the user with the at least one rendered augmentation element, and the feedback analyzer is executed by the at least one hardware processor to analyze feedback of the user with respect to the at least one rendered augmentation element by:

determining the interaction that includes a gesture performed by the user;

controlling, based on the gesture performed by the user, the interaction of the user with the at least one rendered augmentation element by performing an action on the at least one rendered augmentation element;

analyzing the feedback of the user based on a received response to the action performed on the at least one rendered augmentation element; and controlling, based on the analysis of the feedback, the interaction of the user with the at least one rendered augmentation element by performing another action on the at least one rendered augmentation element.

13. The extended reality based positive affect implementation for product development apparatus according to claim 12, wherein the feedback analyzer is executed by the at least one hardware processor to analyze the feedback of the user based on the received response to the action performed on the at least one rendered augmentation element by:

analyzing the feedback of the user based on the received response that includes a change in a sentiment of the user.

14. The extended reality based positive affect implementation for product development apparatus according to claim 12, wherein the feedback analyzer is executed by the at least one hardware processor to analyze the feedback of the user based on the received response to the action performed on the at least one rendered augmentation element by:

analyzing the feedback of the user based on the received response that includes another action performed on the at least one rendered augmentation element.

15. The extended reality based positive affect implementation for product development apparatus according to claim 12, wherein the feedback analyzer is executed by the at least one hardware processor to analyze the feedback of the user based on the received response to the action performed on the at least one rendered augmentation element by:

analyzing the feedback of the user based on the received response that includes a negative sentiment associated with the user, further comprising:

a user permissions controller, executed by the at least one hardware processor, to modify, based on the negative sentiment associated with the user, a permission authorizing the user to perform a specified task.

16. A method for extended reality based positive affect implementation for product development, the method comprising:

determining, by at least one hardware processor, for a user wearing or utilizing a device, characteristics of the user;

determining, by the at least one hardware processor, an environment of the user;

determining, by the at least one hardware processor, based on the characteristics and the environment of the user, a plurality of augmentation elements;

rendering, by the at least one hardware processor, at least one augmentation element from the plurality of augmentation elements in at least one of an extended environment or an immediate environment of the user; and controlling, by the at least one hardware processor, interaction of the user with the at least one rendered augmentation element.

17. The method according to claim 16, further comprising:

analyzing, by the at least one hardware processor, feedback of the user with respect to the at least one rendered augmentation element.

18. A non-transitory computer readable medium having stored thereon machine readable instructions, the machine readable instructions, when executed by at least one hardware processor, cause the at least one hardware processor to:

determine, for a user wearing or utilizing a device, characteristics of the user;

determine an environment of the user;

determine, based on the characteristics and the environment of the user, a plurality of augmentation elements;

generate a recommendation of at least one augmentation element from the determined plurality of augmentation elements;

render the at least one augmentation element in at least one of an extended environment or an immediate environment of the user; and control interaction of the user with the at least one rendered augmentation element.

19. The non-transitory computer readable medium according to claim 18, wherein the machine readable instructions, when executed by the at least one hardware processor, cause the at least one hardware processor to:

analyze feedback of the user with respect to the at least one rendered augmentation element.

20. The non-transitory computer readable medium according to claim 18, wherein the machine readable instructions, when executed by the at least one hardware processor, cause the at least one hardware processor to:

compare the characteristics of the user to characteristics of previous users; and refine, based on the comparison of the characteristics of the user to the characteristics of previous users, the recommendation of the at least one augmentation element from the determined plurality of augmentation elements.

* * * * *